US008109548B2

(12) United States Patent
Jansson et al.

(10) Patent No.: US 8,109,548 B2

(45) Date of Patent: Feb. 7, 2012

(54) VACUUM LIFTING DEVICE FOR LIFTING AND HANDLING OF OBJECTS

(75) Inventors: Kjell Jansson, Stockholm (SE); Peter Widman, Arjepolg (SE)

(73) Assignee: Pronomic AB, Sollentuna (SE)

( * ) Notice: Subject to any disclaimer, the term of this patent is extended or adjusted under 35 U.S.C. 154(b) by 343 days.

(21) Appl. No.: 12/438,260

(22) PCT Filed: Aug. 21, 2007

(86) PCT No.: PCT/SE2007/000737

§ 371 (c)(1),
(2), (4) Date: Feb. 20, 2009

(87) PCT Pub. No.: WO2008/024046

PCT Pub. Date: Feb. 28, 2008

(65) Prior Publication Data

US 2010/0176612 A1 Jul. 15, 2010

(30) Foreign Application Priority Data

Aug. 23, 2006 (SE) ...................................... 0601727

(51) Int. Cl.
*A47J 45/00* (2006.01)

(52) U.S. Cl. ....................................... 294/64.1; 414/627

(58) Field of Classification Search ................. 294/64.1; 414/627, 737

See application file for complete search history.

(56) References Cited

U.S. PATENT DOCUMENTS

| | | | | |
|---|---|---|---|---|
| 3,677,598 | A | 7/1972 | Becker | |
| 3,694,020 | A | 9/1972 | Becker et al. | |
| 4,413,853 | A | 11/1983 | Andersson | |
| 5,431,469 | A * | 7/1995 | Ohno et al. | 294/64.1 |
| 5,816,635 | A * | 10/1998 | Jansson | 294/64.1 |
| 5,934,723 | A * | 8/1999 | Schmalz | 294/64.1 |
| 6,039,530 | A * | 3/2000 | Schmalz et al. | 414/627 |
| 6,056,500 | A * | 5/2000 | Wicen | 414/627 |
| 6,076,872 | A * | 6/2000 | Harter | 294/64.1 |
| 6,168,220 | B1 * | 1/2001 | Schmalz et al. | 294/64.1 |

FOREIGN PATENT DOCUMENTS

| | | |
|---|---|---|
| DE | 100 38 013 A1 | 2/2002 |
| GB | 2 200 615 A | 8/1988 |

OTHER PUBLICATIONS

English Language International Search Report dated Jan. 8, 2008 issued in parent Appln. No. PCT/SE2007/000737.

* cited by examiner

*Primary Examiner* — Saul Rodriguez
*Assistant Examiner* — Stephen Vu
(74) *Attorney, Agent, or Firm* — Holtz, Holtz, Goodman & Chick, PC

(57) ABSTRACT

A vacuum lifting device with a contractible and extensible suction tube and a suction cup, which device is provided with a valve house having an interior that is communicating with the interior of the suction tube. The valve house has an aperture for inlet of air and a valve device for regulating the air inlet by a valve body that is actuated by a rotary cam disc which is rotatable together with a rotary hand grip, which cam disc has a periphery designed to continuously displace the valve body an adjustable distance essentially perpendicular to the turning axis of the cam disc in dependence on the turning angle of the hand grip. A steep increase of the cam disc radius makes possible at need a stepwise displacement of the valve body in addition to the regulated distance.

8 Claims, 3 Drawing Sheets

VACUUM LIFTING DEVICE FOR LIFTING AND HANDLING OF OBJECTS

This application is a U.S. National Phase Application under 35 USC 371 of International Application PCT/SE2007/000737 filed Aug. 21, 2007.

BACKGROUND OF THE INVENTION

1. Field of the Invention

The present invention relates to a vacuum lifting device for lifting and handling of objects, comprising a suction tube suspended at an upper end, a suction cup fitted at a lower end of the suction tube, a low pressure generating device communicating with the inner of the suction tube, which is extensible and contractible in dependence on the vacuum prevailing in the suction tube, a valve house protruding laterally from the suction cup, the inner of which valve house communicates with the inner of the suction tube, and a valve device with a hand grip rotatably mounted on the valve house for adjustable opening and closing of at least one aperture in the valve house wall by means of a regulating device actuated by the hand grip and comprising a closing member movable in relation to the aperture.

2. Description of Related Art

Devices of this type are priorly known, for example from U.S. Pat. No. 5,934,723 disclosing a valve means, known per se in other connections, comprising a rotary valve disc provided with apertures, which valve disc is pressed against a fixed wall also provided with apertures, which are placed such, that at a turning of the valve disc a flow aperture is formed that varies from zero to maximum. A drawback with such a valve arrangement in a wall, behind which a considerable vacuum prevails, consists in that the valve disc in closed position is sucked firmly against the wall, so that a comparatively big power is required to turn the valve disc till a certain opening is achieved. A further drawback when using this valve arrangement for regulating the vacuum in a hoisting device consists in that it is not possible to achieve a flow aperture that is large enough for the suction cup to release an object sucked to the suction cup. In that case the valve arrangement has to be completed with a further valve device coupled to the valve arrangement, which opens a complementary flow aperture that is large enough, which constitutes an undesired complication.

BRIEF SUMMARY OF THE INVENTION

The object of the invention is to achieve an uncomplicated and reliable device of the kind mentioned by way of introduction having the above mentioned drawbacks eliminated.

This has been accomplished according to the invention by the regulating device being provided with a cam disc rotatable together with the hand grip, which cam disc has a periphery designed to continuously displace the closing member an adjustable distance essentially perpendicular to the turning axis of the cam disc in dependence on the turning angle of the hand grip. With the closing member in closed position a certain power is required also in this case for starting the displacement of the closing member, which is simply remedied by giving the periphery of the cam disc a small increase of the radius at the beginning of the turning of the cam disc, but then after a maximum regulating opening has been achieved, it can continue with a strong increase of the radius, such that the closing member is opened rapidly to a flow aperture, that is large enough for the object to get released.

The closing member can have different shapes, for example the shape of shutter covering the aperture in the valve house wall and having a hinge at one edge of the shutter and at an opposed edge has a shoulder against which the cam disc is arranged to act in opening direction. As an alternative the closing member has the shape of a valve body, which is arranged to be displaced in opening direction perpendicular to a valve seat in the aperture, against which valve body the cam disc is arranged to act. Such a valve body may be spherical and in open position guided against the action of a spring in a cage surrounding the valve body.

The closing member may be actuated directly by the cam disc or via an intermediate member, as a rod in a sliding bearing bushing, and the closing member may be displaced against the direction of the air flow either in opening or in closing direction.

At the maneuvering of the suction cup the operator has, in a manner known per se, to grip a fixed handle attached to the valve house and the rotatable hand grip, which is located at a side of the valve house. According to a specially suitable embodiment the cam disc is located inside the valve house. The aperture and the closing member actuated by the cam disc may be located at the top side, the bottom side, or preferably the end wall of the valve house facing the operator.

BRIEF DESCRIPTION OF THE DRAWINGS

The invention will now be explained in more detail in the following with reference to the accompanying drawings which schematically show different embodiments of devices according to the invention, chosen by way of example, and in which.

DETAILED DESCRIPTION OF THE INVENTION

Figure 1:
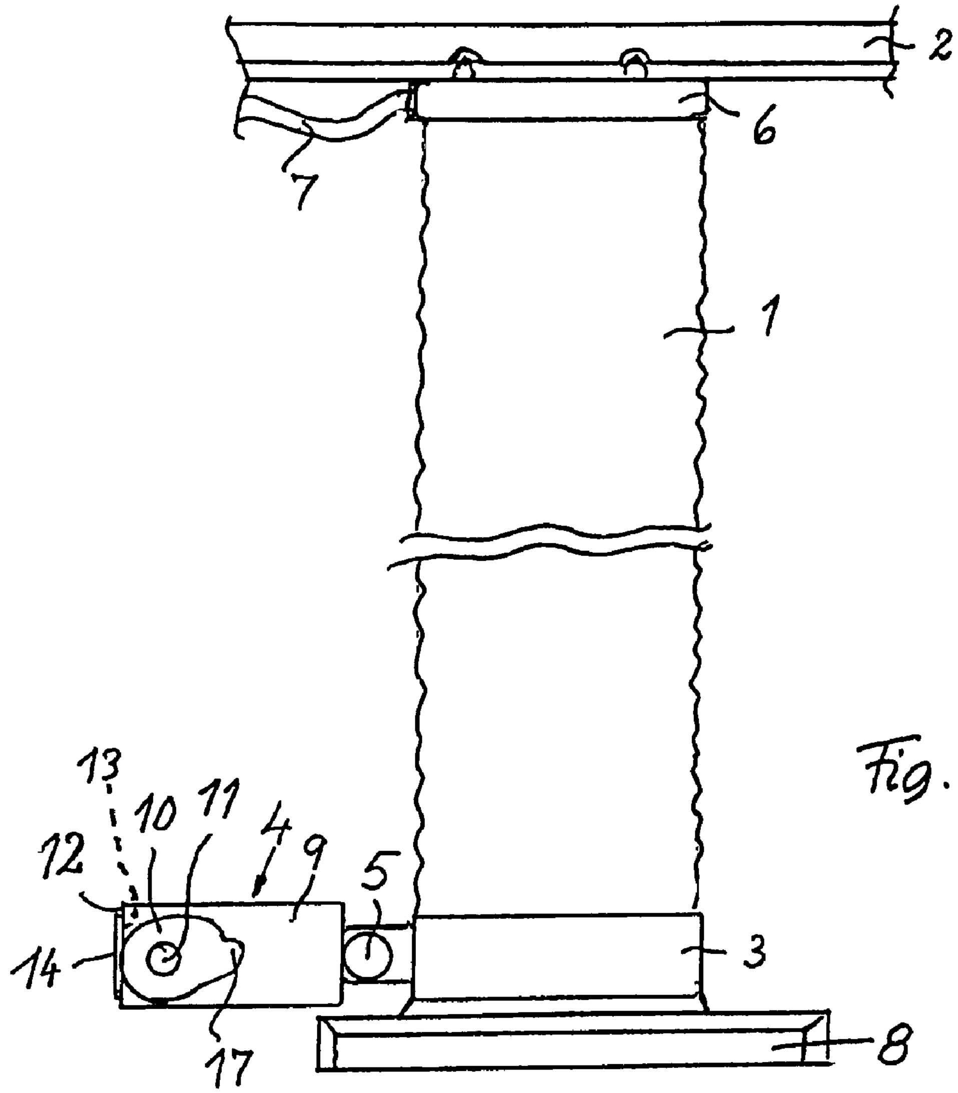
FIG. 1 is a side view of an embodiment of the vacuum lifting device.
Figure 2:
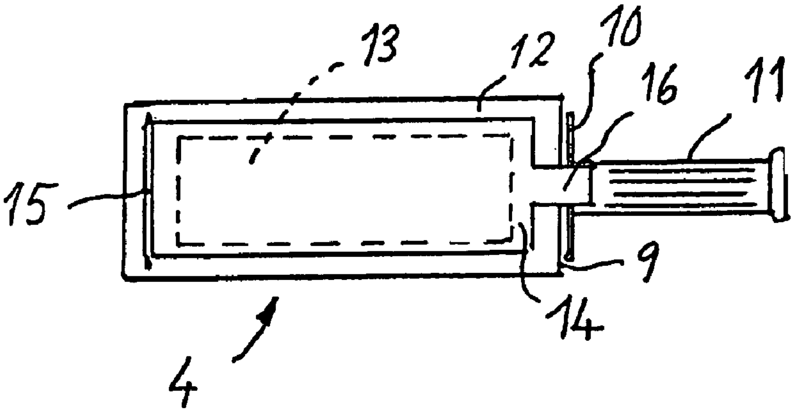
FIG. 2 is an end view of the valve house with an exterior cam disc.

FIG. 1 shows a suction tube 1, which is suspended movable along a roof rail 2. The lower part of the suction tube is provided with a suction cup 3, from which a valve house 4 protrudes laterally communicating with the interior of the suction tube through a flexible joint 5. The upper part of the suction tube is closed by a cover plate 6, to which the suction tube is rotatably and air tight attached, and to which a flexible hose 7 to a vacuum generating means (not shown) is connected. The suction tube 1 is designed in a manner known per se to contract when a vacuum is created, so that the suction cup 3 with an object 8 sucked to the suction cup is lifted. In order to regulate the lifting movement and a following lowering of the suction cup 3, as well as releasing of the object 8, the valve house 4 is provided with a valve device comprising a cam disc 10 rotatably journalled at the outside of one side wall 9 of the valve house, to which cam disc a hand grip 11 is attached for turning the cam disc. The valve house 4 has an end wall 12 in which an aperture 13 is located. The aperture is covered by a closing member in the shape of a shutter 14, which at one edge is provided with a hinge 15 and at an opposed edge is provided with a shoulder 16 protruding out off the side wall 9 of the valve house. The periphery of the cam disc 10 has a radius designed such, that when the cam disc is turned in counter clockwise direction from an initial position the cam disc initially is brought in contact with the shoulder 16 after which the radius slowly increases such that shutter 14 against the action of the vacuum in the valve house and a spring, not shown, integrated with the hinge 15, is opened letting in air in a regulated manner into the valve house and suction tube in dependence on the turning angle of the cam disc and the hand grip. The suction cup 3 with the object 8 is lifted and lowered in this manner, but in order to release the object 8 lowered to a support surface it is necessary to achieve a strong decrease of the vacuum inside the suction cup 3. This is achieved by the fact that the cam disc 10 at a further turning past the real regulating range has a peripheral part 17 with a steep increase of the radius, such that the shutter 14 can be opened further very rapidly to about 45° opening. As an alternative the steep increase of the radius of the cam disc can be utilized in a known manner for opening of a further, laterally hinged shutter covering a further aperture in the side wall 9 of the valve house, or more suitable for opening of a hinged shutter covering a further aperture in the top side of the valve house, which can be carried out in a corresponding way as the opening of the shutter 14.

Figure 3A:
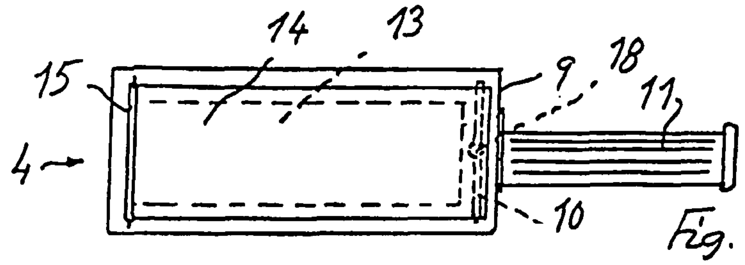
FIG. 3*a* is an end view of the valve house with an interior cam disc.
Figure 3B:
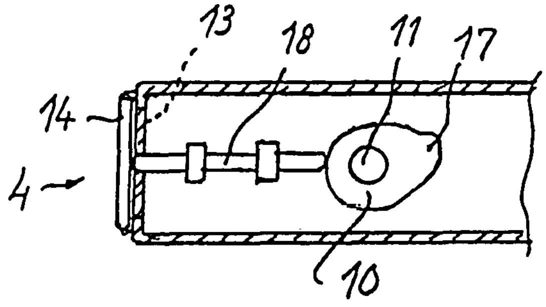
FIG. 3*b* is a side view of a part of the valve house with the wall 9 cut away showing the interior cam disc.

As follows from FIG. 3*a* and FIG. 3*b* the cam disc 10 can have a more protected location at the inner side of side wall 9 of the valve house. In order to eliminate leakage it is suitable to have the shutter 14 actuated by the cam disc via a rod 18 journalled in a sliding bearing bushing at the inner side of the side wall 9.

Figure 4A:
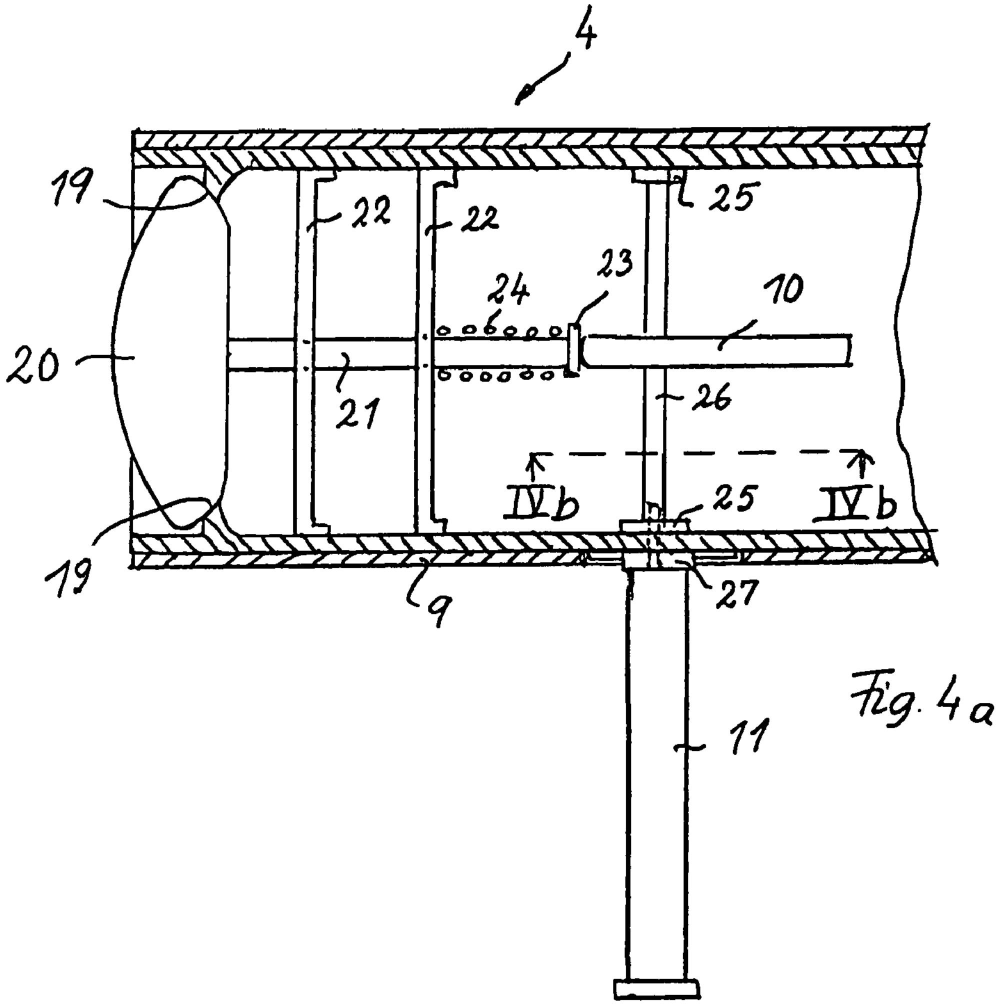
FIG. 4*a* is a view from above of a part of the valve house with the upper half part cut away and showing a further embodiment of the valve device.
Figure 4B:
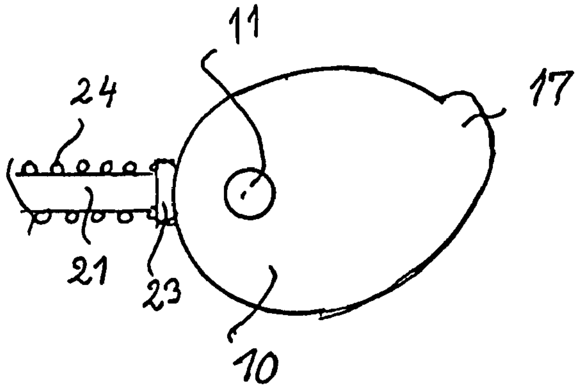
FIG. 4*b* is a side view of the cam disc shown in FIG. 4*a*, and FIGS. 5 and 6 are the same views as shown in FIG. 4*a* but with a spherical valve body.

Air flowing through openings with more or less sharp edges has a tendency to cause noise that can be disturbing in many working environments. FIG. 4*a* and FIG. 4*b* show an embodiment that can eliminate such noise. An opening in the end wall of the valve house is here shaped to form a circular, slightly tapered edge that forms a valve seat 19 for a closing member in the shape of circular, bulging valve body 20 adapted to the valve seat. A rod 21 is attached to the centre of the valve body and is slidingly journalled in two bracings 22 fixedly mounted in the valve house. The rod 21 has a plate 23 attached to the inner end of the rod and between brick and the rear bracing 22 a compression spring 24 that holds the valve body 20 pressed against the valve seat 19. A shaft 26 rotatably journalled in bushings 25 attached to the inner sides of the valve house is fixedly attached to a cam disc 10 located in the extension of the rod 21. On the outside of the side wall 9 of the valve house is a rotatable hand grip 11 journalled in a fixed bushing 27. A splined axle neck of the hand grip extends through an opening in the wall into a corresponding recess in the end of the shaft 26 such that it is possible to turn the cam disc 10 with rotatable hand grip 11.

As indicated in FIG. 4*a* and FIG. 4*b* this embodiment has a valve house that is double-walled. This is for making it possible to assemble the complete valve device outside the real valve house and after that to slide the valve device into the valve house and in situ connect the rotatable hand grip 11.

Figure 5:
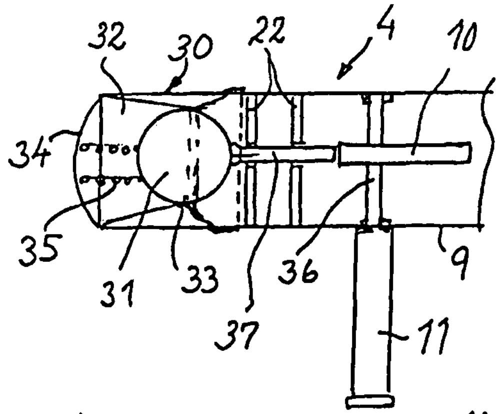

FIG. 5 is a less complicated variant of the embodiment described Above. The outwards directed end of the valve house 4 is open and designed to receive an end part 30 containing a spherical valve body 31 in a conical narrowing inlet tube 32 with a valve seat 33. The outer end of the inlet tube 32 has an outwardly curving grid 34 and a compressed compression spring 35 is located between the grid and the valve body 31. The cam disc 10 is fixedly attached to a shaft 36 rotatably mounted in the valve house, which shaft extends through the side wall 9 and is connected to the rotatable hand grip 11. The cam disc 10 is pushing the' valve body 31 in opening direction against the action of the spring 35 via a freely movable push rod 37 journalled in bracings 22, which push rod is free from the valve body 31.

Figure 6:
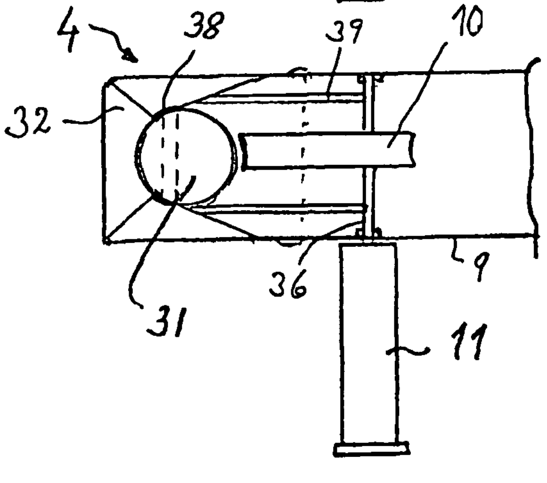

FIG. 6 shows a device which differs from the device shown in FIG. 5 in that the inlet tube 32 has a valve seat 38 which is directed inwards and the spherical valve body 31 is located between the valve seat 38 and the cam disc 10, which, accordingly, is situated to influence on the valve body 31 in closing direction against the flow direction. With the valve body in open position it is guided laterally by thin ribs 39. A corresponding design with the closing member displaceable in closing direction against the flow direction is applicable also to the embodiments described above, in which case the cam disc suitably is arranged to act directly on the closing member.

The three last described embodiments are easy to manufacture and have valve bodies which are easy to replace and are characterized by operating without disturbing noise.

The invention is not limited to the embodiments shown and described by way of example but can be modified in different ways within the scope of the invention defined by the patent claims, in which the rotatable cam disc operated by the rotary hand grip is the principal point.

The invention claimed is:

1. A vacuum lifting device for lifting and handling of objects, comprising:

a suction tube suspended from an upper end of the vacuum lifting device;

a suction cup fitted at a lower end of the suction tube;

a low pressure presenting flexible hose communicating with an interior of the suction tube, wherein the suction tube is extensible and contractible in response to a vacuum prevailing therein, a valve house protruding laterally from the suction cup, an interior of the valve house communicating with the interior of the suction tube, and a valve device with a hand grip rotatably mounted on the valve house for adjustable opening and closing of at least one aperture in a valve house wall by a regulating device actuated by the hand grip and comprising a closing member movable in relation to the aperture, wherein the regulating device is provided with a cam disc rotatable together with the hand grip, and the cam disc has a periphery configured to continuously displace the closing member an adjustable distance substantially perpendicular to a turning axis of the cam disc based on a turning angle of the hand grip, and wherein the closing member has a shutter shape covering the aperture in the valve house wall and has a hinge at one edge of the shutter and at an opposed edge has a shoulder against which the cam disc is arranged to act in an opening direction.

2. A device according to claim 1, wherein the closing member is actuated by the cam disc via an intermediate member.

3. A device according to claim 2 wherein the cam disc is located inside the valve house.

4. A device according to claim 2, wherein the cam disc, in addition to a peripheral distance corresponding to an intended regulating range, has an increasing radius for increasing a speed of an opening movement of the closing member.

5. A device according to claim 2, wherein the intermediate member comprises a rod in a sliding bearing bushing.

6. A device according to claim 1, wherein the cam disc is located inside the valve house.

7. A device according to claim 1, wherein the cam disc, in addition to a peripheral distance corresponding to an intended regulating range, has an increasing radius for increasing a speed of an opening movement of the closing member.

8. A device according to claim 1, wherein the aperture in the valve house wall is located in an end wall of the valve house directed laterally out from the suction cup.

* * * * *